United States Patent [19]

Geppert

[11] 4,287,880
[45] Sep. 8, 1981

[54] SOLAR COLLECTOR

[76] Inventor: John M. Geppert, 3282 S. 77th Ave., Omaha, Nebr. 68124

[21] Appl. No.: 93,756

[22] Filed: Nov. 13, 1979

[51] Int. Cl.³ .............................................. F24J 3/02
[52] U.S. Cl. .................................. 126/439; 126/441
[58] Field of Search ............... 126/438, 439, 441, 417, 126/450, 451

[56] References Cited

U.S. PATENT DOCUMENTS

| | | | |
|---|---|---|---|
| 3,923,039 | 12/1975 | Falbel | 126/438 |
| 3,974,824 | 8/1976 | Smith | 126/438 |
| 3,991,740 | 11/1976 | Rabl | 126/438 |
| 4,003,366 | 1/1977 | Lightfoot | 126/449 |
| 4,024,852 | 5/1977 | L'Esperance et al. | 126/438 |
| 4,059,093 | 11/1977 | Knowles et al. | 126/438 |
| 4,059,094 | 11/1977 | de Mendoza | 126/439 |
| 4,088,116 | 5/1978 | Pastor | 126/439 |
| 4,132,219 | 1/1979 | Cohen et al. | 126/438 |
| 4,132,222 | 1/1979 | Roark | 126/439 |
| 4,142,510 | 3/1979 | Hare et al. | 126/438 |

*Primary Examiner*—Daniel J. O'Connor
*Attorney, Agent, or Firm*—Zarley, McKee, Thomte, Voorhees & Sease

[57] ABSTRACT

A stationary solar heat collector includes a reflector having a substantially upwardly facing concave reflective surface and an absorber tube supported relative to the reflective surface for receiving reflected sunrays therefrom. The reflective surface is defined in cross-section by first, second and third semi-parabolic curves arranged in generally end-to-end relation, thereby to define a generally C-shape. The reflective surface may be of a shape generated by moving the curves along a line perpendicular to the plane of the curves or approximately of a shape generated by rotating the curves about the free end of the first curve.

15 Claims, 5 Drawing Figures

SOLAR COLLECTOR

BACKGROUND OF THE INVENTION

The present invention is directed generally to solar energy collectors and more particularly to a solar concentrating collector which will remain focused for a maximum portion of a day's sun hours without tracking movement.

Solar collectors can generally be classified as either concentrators or non-concentrators. A common form of non-concentrator is the flat plate collector wherein sunrays directly strike a flat absorber plate. But flat plate collector installations are restricted to locations having the required southern exposure.

Solar concentrators, including either a lens or arcuate reflective surface, are commercially available but many of these devices require a tracking mechanism for pivotally moving the device for following the sun's movement across the sky. The costs associated with the purchase and maintenance of such devices are believed to be prohibitive for general home use.

In recent years, various solar concentrators have been developed which do not require a tracking mechanism. These generally take the form of a concave reflective surface adapted to focus the sun's rays onto an absorber element. The reflective surfaces of such devices have taken the shape of a hyperbolic curve, a parabola combined with a semicircle and a parabola combined with a spiral, for example. Whereas these collectors do not require a tracking mechanism, certain problems are associated with their operation. The acceptance angle of some is so limited that the sun's rays can be received for only a relatively small portion of the daylight hours. In others, the concentration factor may be satisfactory only during a limited preferred time of day with the result that the average concentration factor is relatively small.

Accordingly, it is a primary object of the invention to provide an improved concentrating solar collector.

Another object is to provide a solar collector which is operative when installed to face a southerly, easterly or westerly direction.

A related object is to provide a solar collector adapted to operate without a tracking mechanism.

Another object is to provide a solar collector with a maximum average daily concentration factor.

Another object is to provide a solar collector having an acceptance angle so as to be operative during a maximum number of daytime hours.

A specific object is to provide a concentrating solar collector wherein the sun's rays are never reflected more than twice before striking the absorber thereof.

Finally, an object is to provide a concentrating solar collector which is economical to manufacture, simple in construction and efficient in operation.

SUMMARY OF THE INVENTION

The stationary solar heat collector of the present invention includes a reflector having a substantially upwardly facing concave reflective surface and an absorber tube supported relative to the reflective surface for receiving reflected sunrays therefrom. The reflective surface is defined in cross-section by first, second and third semi-parabolic curves arranged in generally end-to-end relation. The surface may have a shape generated by moving the curves along a line perpendicular to the plane of the curve or by rotating the curves about the free end of the first curve.

The equations, lengths and orientation of the three curves relative to one another have been selected to maximize the acceptance angle of the collector for operation during a majority of the daylight hours, and further to maximize the average daily concentration factor for a maximum BTU output for a given size collector. Finally, the combined semi-parabolic curves of the reflective surface cooperate so that accepted sunrays are never reflected more than twice before striking the absorber tube.

DESCRIPTION OF THE PREFERRED EMBODIMENTS

Figure 1:
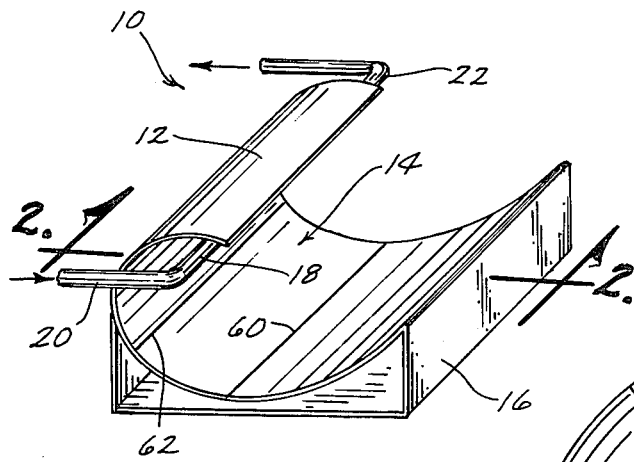
FIG. 1 is a perspective side view of one embodiment of the concentrating solar collector of the invention.

The solar collector of the present invention, indicated generally at 10 in FIG. 1, includes a reflector 12 including a substantially upwardly facing concave reflective surface 14. Reflector 12 is a rigid generally C-shape member supported on a channel-shaped frame 16 for proper orientation relative to a support surface.

An elongated absorber tube 18 extends longitudinally of the reflective surface 14 at a position for receiving reflected sunrays therefrom. The absorber tube 18 is connected to a conventional heat transfer system (not shown) whereby fluid is pumped into one end of the tube as at 20 for receiving heat from the tube by conduction, whereupon the fluid flows out from the opposite end as at 22 for conveying the absorbed heat energy to the system in the usual manner. Absorber tube 18 is preferably formed of a thermally conductive material such as copper which may be coated with a black or other absorbing layer such as a paint developed by N.A.S.A. for this purpose.

Figure 2:
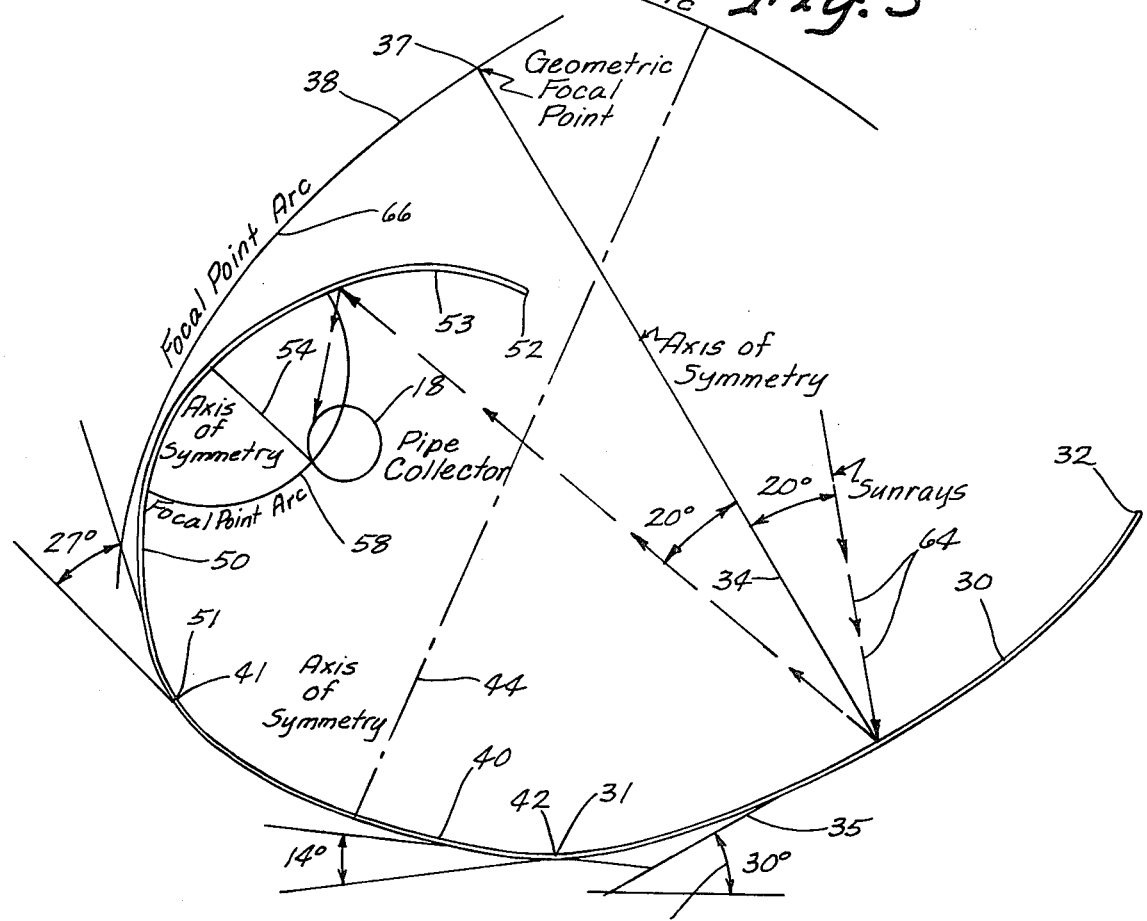
FIG. 2 is an enlarged transverse sectional view of the solar collector, taken along line 2—2 in FIG. 1, showing the axes of symmetry for the respective curves.

Referring to FIG. 2, reflective surface 14 is defined in cross-section by first, second and third semi-parabolic curves 30, 40 and 50 respectively which are arranged in generally end-to-end relation. Second curve 40 is interposed between the first and third curves and includes opposite ends 41 and 42 which engage the interior ends 31 and 51 of the first and third curves respectively. The first and third curves also includes free ends 32 and 52 respectively.

The three curves are arranged with the first and second curves 30 and 40 disposed in generally upwardly facing relation and with the third curve 50 disposed in generally downwardly facing relation to define a somewhat C-shape with the absorber tube 18 positioned below at least an upper portion 53 of the third curve. In the preferred embodiment, each of the three curves is centrally intersected by the respective axis of symmetry therefor, as indicated at 34, 44 and 54. Likewise, the curves in the preferred embodiment are defined by the following equations:

First curve 30: $Y = X^2/110.25$ wherein Y is greater than or equal to 0 and less than or equal to 12;

Second curve 40: $Y = X^2/112$ wherein Y is greater than or equal to 0 and less than or equal to 4.5; and Third curve 50: $Y = X^2/50$ wherein Y is greater than or equal to 0 and less than or equal to 20.

First curve 30 is referred to as the leveling curve for orienting the reflector 12 relative to the horizontal. The axis of symmetry 34 of the first curve 30 is to be inclined upwardly and toward the third curve 50 at a 60° angle to the horizontal or, as shown in FIG. 2, the tangent 35 to the center of the first curve 30 forms an included angle 36 of 30° relative to the horizontal.

The second and third curves 40 and 50 may then be oriented relative to the first curve 30. Specifically, the tangents of the adjacent ends 31 and 42 of the first and second curves respectively are inclined 14° relative to one another so as to define a first seam 60 across the reflective surface. Likewise, the tangents to the adjacent ends 41 and 51 of the second and third curves respectively are inclined 27° relative to one another as shown in FIG. 2 so as to define a second seam 62 which is apparent in FIG. 1.

Absorber tube 18 is situated so as to be generally tangentially contacted by the axis of symmetry 54 for the third curve 50 and so as to be substantially intersected by the focal point arc 58 of the third curve as described hereinbelow.

A brief explanation of the reflection characteristics of a parabolic curve will facilitate an understanding of the operating characteristics of the solar collector 10. A parabola consists of a pair of curves which are arranged on opposite sides of the axis of symmetry thereof and which are therefore the mirror image of one another. With reference to a reflective surface in the form of a parabola, any light directed onto the surface along a line parallel to the axis of symmetry will always be reflected to the geometric focal point as indicated at 37 for first curve 30 in FIG. 2. This is true whether the light strikes the curve adjacent end 31, near the center or adjacent end 32 so long as the light is parallel to the axis of symmetry 34. If sunrays are inclined relative to the axis of symmetry, such as the rays indicated by arrows 64 in FIG. 2 which are 20° offset from the axis of symmetry, the focal point 66 thereof will be offset from the geometric focal point by the same angle on the opposite side of the axis of symmetry 34. Again if light parallel to arrows 64 strikes the first curve 30 at any position therealong, it will be reflected to the respective focal point 66. The totality of focal points for all possible angles of sunrays is represented by the focal point arc which may be generated by rotating the geometric focal point about the point of intersection between the axis of symmetry and parabolic curve.

Figure 3:
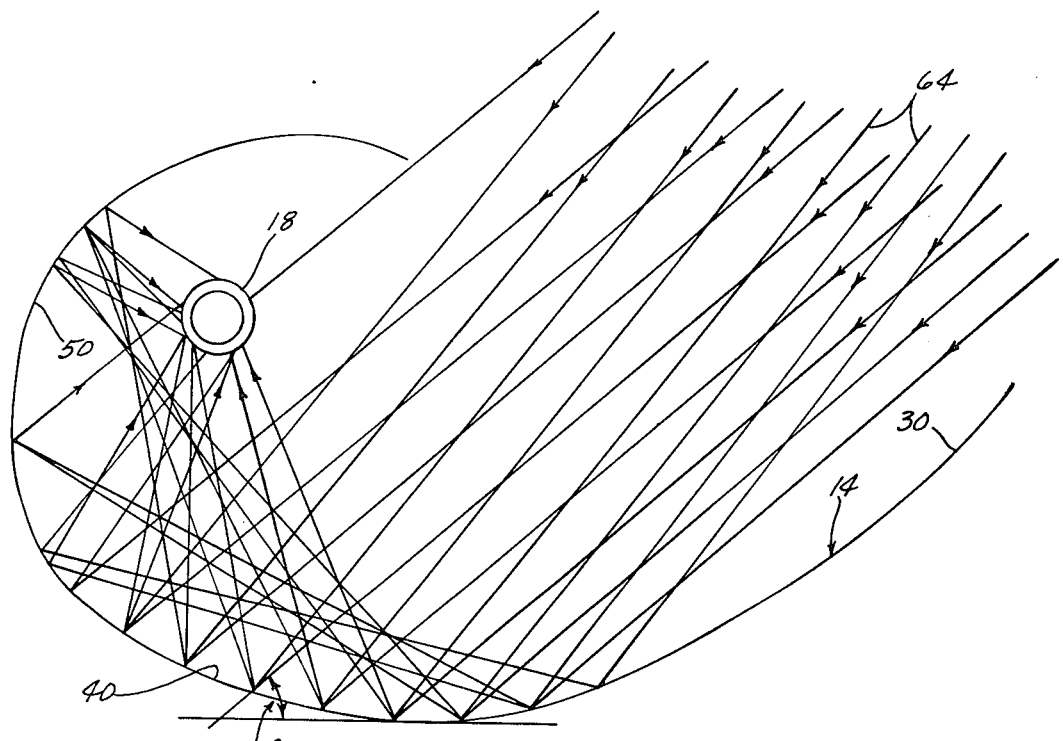
FIG. 3 is a transverse sectional view of the collector, similar to FIG. 2, showing the acceptance of morning sunlight at angles of 40° and 50°.
Figure 4:
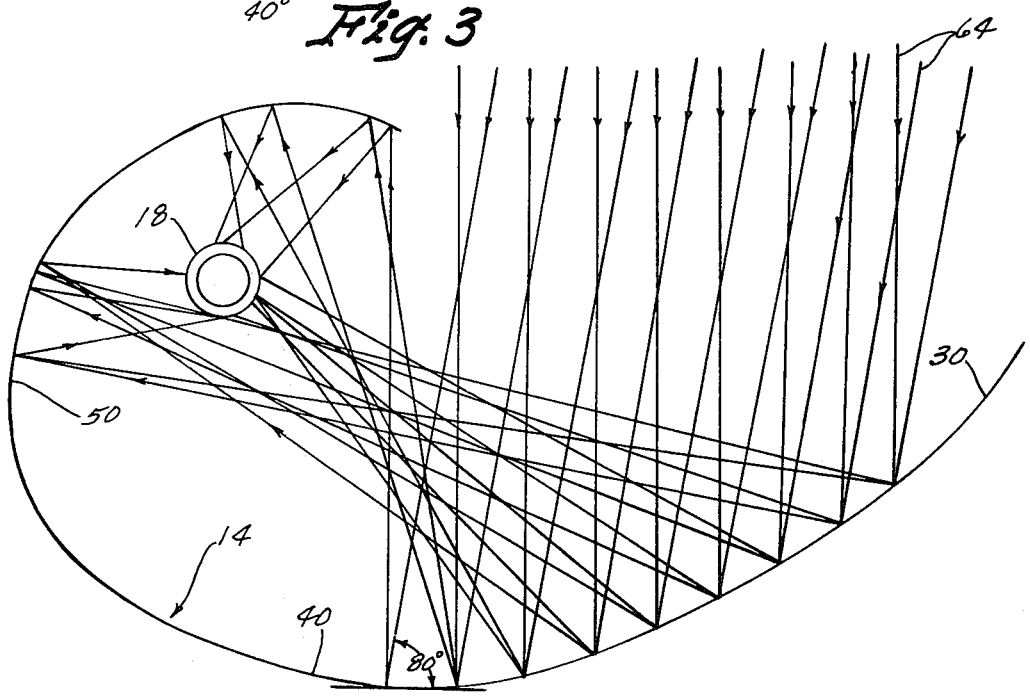
FIG. 4 is a transverse sectional view of the collector showing the acceptance of afternoon sunlight at angles of 80° and 90°.

The efficiency of a concentrating solar collector can be measured in terms of its acceptance angle and concentration factor. The acceptance angle, sometimes referred to as the field of view of the collector, is the angular variation of sunlight which will strike or be reflected onto the absorber tube 18. Referring to FIG. 2, it is apparent that horizontal or 0° sunlight from the right-hand side of the page as at dawn will strike the absorber pipe 18 directly because the free end 32 of first curve 30 is situated vertically below the absorber tube 18. FIGS. 2, 3 and 4 thus show an installation of the solar collection 10 facing in an easterly direction, i.e. the free end 32 of first curve 30 is positioned toward the east. As the sun rises during the morning hours, sunlight will strike the reflective surface 14 at angles of 40° and 50° for example as shown in FIG. 3, wherein it can be seen that all of the light is concentrated by reflection onto the absorber tube 18. As the sun continues to rise in the afternoon, rays will strike the reflective surface 14 at angles of 80° and 90° as indicated in FIG. 4, wherein it can be seen that all of the light up to these angles is also concentrated onto the absorber tube 18.

In FIG. 2, the arrows 64 indicate a 110° inclination of sunlight and it can be seen that these rays are concentrated onto the absorber tube 18 as well. Accordingly, the acceptance angle for the solar collector 10 is at least 100°.

Concentration factor is approximately the ratio of the length of the curve being struck by direct sunlight to the diameter of the absorber tube 18. For the preferred embodiment shown, the concentration factor varies from 0 to 12 at different times of the day with an average daily concentration factor of approximately 7.5.

Figure 5:
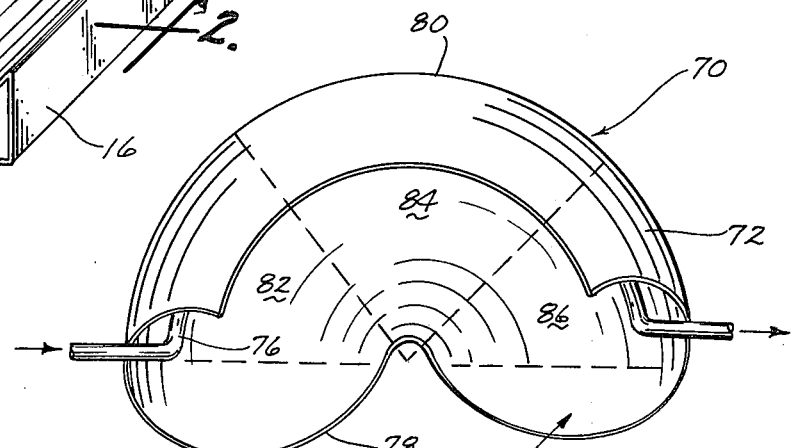
FIG. 5 is a perspective view of an alternate embodiment of the invention.

An alternate embodiment of the present invention is shown in FIG. 5 wherein a solar collector 70 comprises a reflector 72 having a substantially upwardly facing reflective surface 74. In cross-section, reflective surface 74 includes substantially the same combination of three semi-parabolic curves as in the embodiment of FIG. 1 except that in this alternate embodiment, the reflective surface is generated approximately by rotating the curves about the free end 32 of the first curve 30. The absorber tube 76 is also formed of a somewhat U-shape in order to maintain a uniform positional relationship to the reflective surface at every circumferential position therealong.

Solar collector 70 is designed to face south, that is the open edge 78 is positioned toward the south and the closed backside 80 of the reflector faces north. Solar collector 70 will remain focused 100% of the time both daily and seasonally, with the left-hand section 82 absorbing the morning sun, the central section 84 absorbing the mid-day sunrays and the right-hand section 86 absorbing the late day sunrays. This embodiment will find ready application in industry where a full-time tracking effect is necessary.

Whereas the invention has been shown and described with relation to two preferred embodiments having reflective surfaces defined in cross-section by a similar combination of three semiparabolic curves as precisely defined herein, it is to be understood that various modifications, changes and alterations can be made without departing from the intended broad scope of the invention as defined in the appended claims. The particular equations and lengths of the curve sections have been selected to maximize both the acceptance angle and concentration factor of the solar collectors. It is contemplated that the equations, lengths and relative orientation of the three semi-parabolic curves may be altered to construct various reflective surfaces having characteristic acceptance angles and concentration factors within an acceptable range.

Another measure of the efficiency of concentrating solar collectors is the number of times that sunrays must be reflected before striking the absorber tube. Because a perfect reflector is not possible, some rays will be absorbed and others will be scattered by the reflective surface each time rays are reflected by it. Whereas prior concentrating solar collectors require the rays to be reflected many times at certain times of day depending on the elevation of the sun, it is apparent in FIGS. 2-4 that rays are never reflected more than twice by the collector of the present invention for any inclination of sunrays within the entire 110° angle of acceptance.

Thus there has been shown and described a solar collector which accomplishes at least all of the stated objects.

I claim:

1. A stationary solar heat collector comprising,
   a reflector including a substantially upwardly facing concave reflective surface,
   an absorber tube,
   means for supporting said absorber tube relative to said reflective surface for receiving reflected sunrays therefrom,
   said reflective surface being defined in cross-section by first, second and third semi-parabolic curves arranged in generally end-to-end relation,
   said second curve being interposed between said first and third curves, said first and third curves each including a free end and an opposite end situated adjacent a respective end of said second curve,
   said first and second curves being disposed in generally upwardly facing relation and said third curve being disposed in generally downwardly facing relation, said absorber tube being positioned below at least an upper portion of said third curve,
   said first, second and third semi-parabolic curves each being generally centrally intersected by the respective axis of symmetry therefor,
   said first curve being oriented such that the axis of symmetry thereof is inclined upwardly and toward said third curve, and
   said second curve being oriented such that the axis of symmetry thereof is inclined upwardly and toward said first curve.

2. The solar collector of claim 1 wherein said first curve is oriented such that the included angle between the axis of symmetry thereof and a horizontal plane extended toward said second curve is between 50° and 70°.

3. The solar collector of claim 2 wherein said included angle is approximately equal to 60°.

4. The solar collector of claim 2 wherein tangents to the adjacent ends of said first and second curves are inclined between 9° and 19° relative to one another.

5. The solar collector of claim 4 wherein tangents of the adjacent ends of said first and second curves are inclined approximately 14° relative to one another.

6. The solar collector of claim 2 wherein tangents to the adjacent ends of said second and third curves are inclined between 22° and 32° relative to one another.

7. The solar collector of claim 6 wherein tangents to the adjacent ends of said first and second curves are inclined approximately 27° relative to one another.

8. The solar collector of claim 1 wherein said first curve is approximately defined by the equation $Y = X^2/110.25$ wherein Y is greater than or equal to approximately 0 and less than or equal to approximately 12.

9. The solar collector of claim 1 wherein said second curve is approximately defined by the equation $Y = X^2/112$ wherein Y is greater than or equal to approximately 0 and less than or equal to approximately 4.5.

10. The solar collector of claim 1 wherein said third curve is approximately defined by the equation $Y = X^2/50$ wherein Y is greater than or equal to approximately 0 and less than or equal to approximately 20.

11. The solar collector of claim 1 wherein the axis of symmetry of said second curve intersects said third curve adjacent the free end thereof.

12. The solar collector of claim 1 wherein said absorber tube is supported at a position intersected by the focal point arc of said third curve.

13. The solar collector of claim 1 wherein the free end of said first curve is disposed below the absorber tube whereby horizontal rays may strike said absorber tube directly.

14. The solar collector of claim 1 wherein said reflective surface is generally of a shape generated by moving said curves along a line perpendicular to the plane of said curves.

15. The solar collector of claim 1 wherein said reflective surface is generally of a shape generated by rotating said curves about the free end of said first curve.

* * * * *